United States Patent

Riedl

[11] Patent Number: 6,029,652
[45] Date of Patent: Feb. 29, 2000

[54] COVER HOOD FOR FRYING OR COOKING UTENSILS

[75] Inventor: Horst Riedl, Schrobenhausen, Germany

[73] Assignee: H. Zenker GmbH & Co. KG Metallwarenfabrik, Aichach, Germany

[21] Appl. No.: 09/027,425

[22] Filed: Feb. 20, 1998

[30] Foreign Application Priority Data

Mar. 7, 1997 [DE] Germany ............ 297 04 847 U

[51] Int. Cl.[7] ............................................. F24C 15/20
[52] U.S. Cl. ..................... 126/299 C; 126/299 R; 126/218; 220/761; 220/763; 220/731
[58] Field of Search ............... 126/299 C, 299 R, 126/218, 220, 389, 384, 214 C; 431/144; 454/49, 67; 99/425, 446; 220/367.1, 368, 369, 912, 287, 752, 212.5, 761, 762, 763, 764, 766, 731; 215/319

[56] References Cited

U.S. PATENT DOCUMENTS

| | | | |
|---|---|---|---|
| 883,652 | 3/1908 | Lenshow et al. | 220/762 |
| 984,318 | 2/1911 | Thomas | 126/384 |
| 1,077,946 | 11/1913 | Walk | 220/763 |
| 1,109,990 | 9/1914 | Holmes | 220/912 |
| 1,361,348 | 12/1920 | Pfisterer | 220/287 |
| 1,627,099 | 5/1927 | Landgren et al. | |
| 2,524,554 | 10/1950 | White | 126/299 C |
| 2,664,169 | 12/1953 | Misener et al. | 126/299 C |
| 4,198,040 | 4/1980 | Colasent | 220/287 |
| 4,512,497 | 4/1985 | Grusin | 220/369 |
| 4,700,689 | 10/1987 | Speker | 126/384 |
| 4,747,392 | 5/1988 | Rogers | 126/299 C |
| 5,481,967 | 1/1996 | Chen | 126/299 C |
| 5,555,994 | 9/1996 | Chen | 220/287 |
| 5,595,108 | 1/1997 | Sheu | 220/367.1 |

FOREIGN PATENT DOCUMENTS 3505630 8/1986 Germany .

Primary Examiner—Ira S. Lazarus
Assistant Examiner—Josiah C. Cocks
Attorney, Agent, or Firm—Christie, Parker & Hale, LLP

[57] ABSTRACT

A cover hood for a cooking utensil, such as a pot, kettle, pan, or the like, which includes a conical hood made from a spray protection grid and a bearing part comprising a bearing ring attached to a lower edge of the hood and protruding substantially horizontally from the lower edge of the hood. The spray protection grid is made of a wire mesh or a perforated metal plate material.

16 Claims, 3 Drawing Sheets

COVER HOOD FOR FRYING OR COOKING UTENSILS

BACKGROUND OF THE INVENTION

Cover hoods for frying and cooking utensils, for example, pots, kettles, pans, or the like, serve to protect the cooking or frying area from fat splashes and to increase the temperature on the upper side of the food being prepared in order to reduce the cooking time and the amount of energy to be used for frying or cooking.

U.S. Pat. No. 1,627,099 describes a cover hood for frying pans where a toroidal collar part which is provided with a handle is placed on the frying pan. The collar part consists of two concentric cylindrical sheet metal walls which are offset vertically from each other wherein the inner cylindrical metal wall is arranged underneath the outer cylindrical wall. From the lower edge of the outer cylindrical wall a radial base leads to the inner cylindrical wall so that a circumferential channel is formed between the two walls. A conical hood part which is closed at the top is insertable from above into the collar part. The outer diameter of the hood part is the same as the inner diameter of the outer cylindrical wall and rests on three inwardly directed lugs spaced over the circumference of the outer cylindrical wall.

A disadvantage with this known cover hood is that the closed conical hood part fits sealingly on the collar part and this in turn fits tightly on the frying pan so that the pan is closed at the top. Although no fat splashes can pass to the outside and underneath the hood and there is an increased temperature, steam formed by the water emerging from the food is trapped under the cover hood which changes the consistency of the food and impairs the taste of the food.

German Patent No. 35 05 630 Cl describes a cover hood for frying and cooking equipment which has a hood part conical in section and able to fit loosely in a toroidal collar seated on the cooking or frying pan. The collar is provided on its outside with a raised edge and on its lower side with a channel. The tip of the hood part has an opening and the hood part is held vertically spaced above the channel and laterally spaced next to the raised edge. As a result of the ring-shaped gap formed therebetween, air can pass underneath the cover hood, be mixed with the water vapor underneath the hood and then escape through the opening at the tip of the cover hood.

Since the collar of the known cover hood is provided on its underside with a downwardly and inwardly tapering inclined base, the collar can be placed on pans or pots of different diameter as a result of its conical base.

A disadvantage with this known cover hood is the expensive construction, more particularly of the toroidal collar as well as the loose connection between the conical hood part and the toroidal collar which leads to problems with the storage of the hood, difficult handling, and possibly to damage of the conical hood part which normally consists of glass. Owing to its restricted length, the inwardly tapering inclined base of the collar makes the hood suitable only for frying and cooking utensils with only slightly deviating diameters wherein when used for pans with large diameters there is the danger that the inclined base rests on the food being cooked.

SUMMARY OF THE INVENTION

According to one embodiment of the invention, a cover hood for a cooking utensil is provided which includes a conical hood made from a spray protection grid and a bearing part comprising a bearing ring attached to a lower edge of the hood and protruding substantially horizontally from the lower edge of the hood. The spray protection grid is made of a wire mesh or a perforated plate.

With an embodiment of the present invention, it is possible to achieve a cover hood for frying and cooking utensils, for example pots and pans, which is simple to construct, easy to handle and suitable for use with frying or cooking utensils of different diameters.

Also it is possible to achieve a cover hood with a sturdy structure and for simple handling, both when frying or cooking and when storing the hood. Such a cover hood is suitable for use with frying or cooking utensils of clearly different diameters without different hood sizes being required.

According to another embodiment, the conical hood part consists of a splash protection grid. The splash protection grid itself can be made of a woven wire mesh or a punched perforated plate. Accordingly, it requires no additional channel at the lower end of the conical hood part to collect up condensation since water vapor can escape through the grid without fat splashes contaminating the cooking or frying area. The bearing ring which protrudes horizontally from the lower edge of the conical hood part ensures that even with frying or cooking utensils having different diameters there is a space on the bearing ring which corresponds to that of a lid for the frying pan or saucepan, thereby ensuring that the cover hood is kept away from the bottom of the pan.

An advantageous further embodiment of the invention is characterized in that the bearing ring has at least two concentric indents or circumferential grooves which can be placed on the edge of the utensil. These circumferential grooves are adapted to the marginal diameters of the frying or cooking utensils and ensure a secure seating of the hood on the utensil wherein only the chosen width of the bearing ring restricts the usability of the hood according to the invention for frying or cooking utensils of different diameter. Since the concentric indents or circumferential grooves can be arranged close together, the cover hood according to the invention is also suitable for frying or cooking utensils with only slightly deviating diameters.

As an alternative embodiment, the bearing ring can have on its underside perpendicularly protruding webs which are arranged concentrically with each other and with different diameters.

Another advantageous embodiment of the invention is characterized in that the lower edge of the hood part includes a handling element which preferably consists of a hinged handle.

This arrangement of a hinged handle on the lower edge of the conical hood part in the transition area between the bearing ring and the hood part ensures a simple and safe handling of the cover hood since the attachment of the handling element is provided at a position which allows easy fitting of the hood on a cooking or frying utensil. Also, as a result of the hinged handle, the hood can be easily stacked and stowed away.

The hinged handle preferably adjoins the conical hood part in the rest position and protrudes laterally away from the conical hood part in the handling position. In the handling position, the hinged handle preferably forms an acute angle with the bearing ring.

The shape of the bearing ring can be that of a circular ring, ellipsoidal or rectangular with semi-circular end sides whereas the base face of the hood part is preferably ellipsoidal or substantially ellipsoidal.

The conical hood part preferably consists of a truncated cone with an upper circular ring shaped opening which is provided with a flanged edge or curved cover ring for better handling and protection. The curved cover ring can be made of metal or plastic. The upper opening serves as a chute opening through which liquid and seasonings can be easily poured in.

In another embodiment, a connecting web is mounted between the attachment of the handling element and the flanged edge or ring-shaped cap. The attachment of the handling element, the flanged edge or the ring-shaped cap and the connecting web can preferably be formed in one piece of plastic.

DESCRIPTION OF THE DRAWINGS

The invention will now be described in more detail with reference to the embodiment shown in the drawings in which.

DETAILED DESCRIPTION OF THE INVENTION

Figure 1:
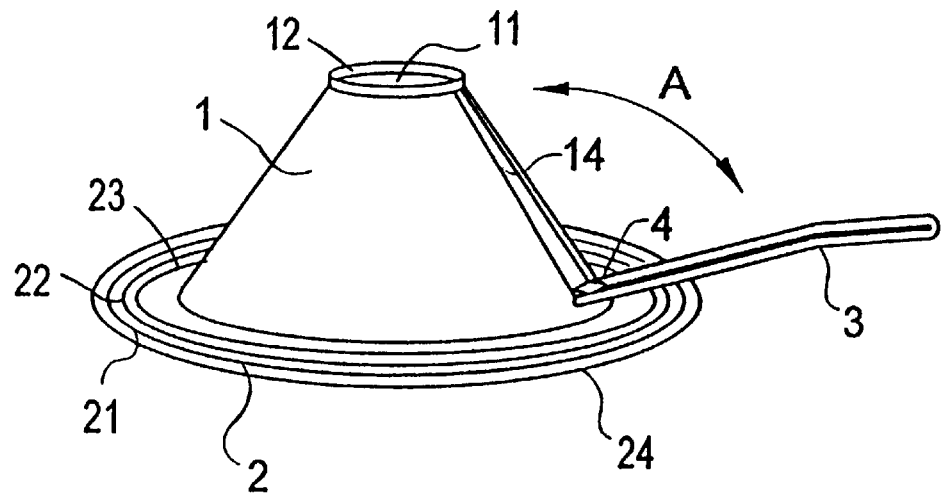
FIG. 1 is a perspective view of the cover hood according to an embodiment of the invention.

FIG. 1 shows a cover hood according to an embodiment of the invention which includes a frusto-conical hood part 1 formed from a splash protection grid 10 having an upper opening 11 set with a curved cover ring 12. At its lower end, the conical hood part 1 is connected to a horizontally protruding bearing ring 2 which comprises a circular ring with several concentric indentations 21, 22 and 23 and an outer downwardly curved edge 24.

Preferably, the bearing ring 2 has an inner and outer diameter such that the cover hood fits all standard sized cooking or frying utensils such as pots, kettles, pans, or the like.

Figure 2:
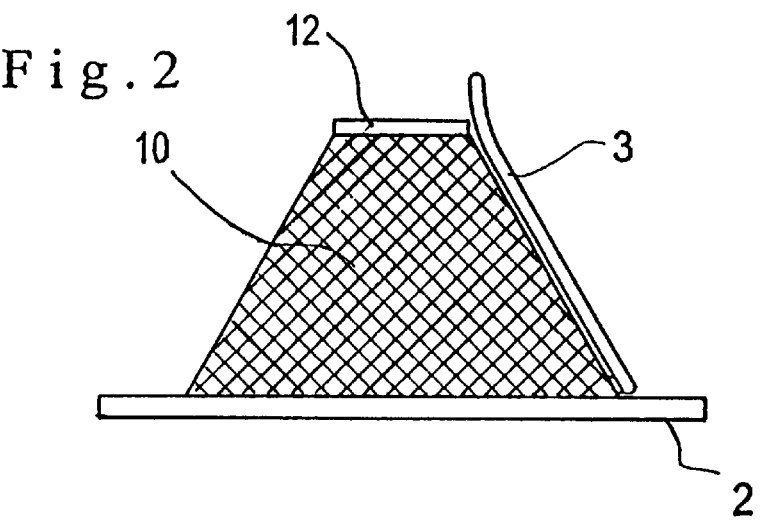
FIG. 2 is a sectional side view of the cover hood of FIG. 1 with hinged handle adjoining the hood part in a storage position.
Figure 3:
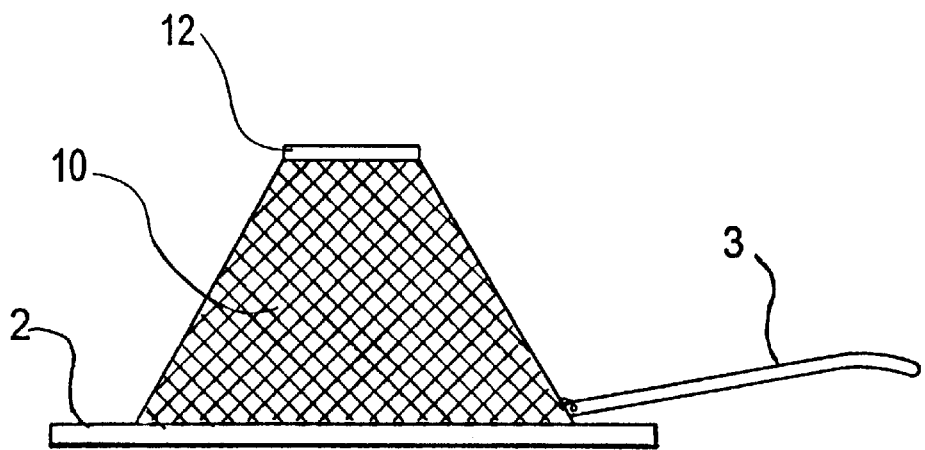
FIG. 3 is a sectional side view of the cover hood of FIG. 1 with the hinged handle unfolded in a handling position.

A folding handle 3 is attached to the lower edge of the conical hood part 1 by means of a hinge, push-on axle 4 or the like, and can swivel in the direction of arrow A so that in a stacking or storage position according to FIG. 2 it adjoins the frusto-conical surface of the hood part 1, and in a useful position according to FIG. 3, it can be unfolded from the hood part 1 so that it extends at an acute angle from the bearing ring 2.

For a fixed connection between the hinged handle and conical hood part which is made, where applicable, of flexible wire mesh, a connecting web 14 is provided between the attachment 4 of the hinged handle 3 and the cover ring 12 so that pressing of the handle 3 in the hood part 1 is prevented. The hinged handle 3 in the stacking or storage position lies flush against the surface of the conical hood part and has in the useful position no contact with the hot surface of the bearing ring 2 which can be heated to considerable temperatures by its contact with the cooking or frying utensil.

In a modification of the embodiment according to FIGS. 1 to 3, the base surface of the cover hood can also be ellipsoidal or rectangular with circular end faces if the cover hood is to be used for correspondingly formed frying or cooking vessels.

Figure 4:
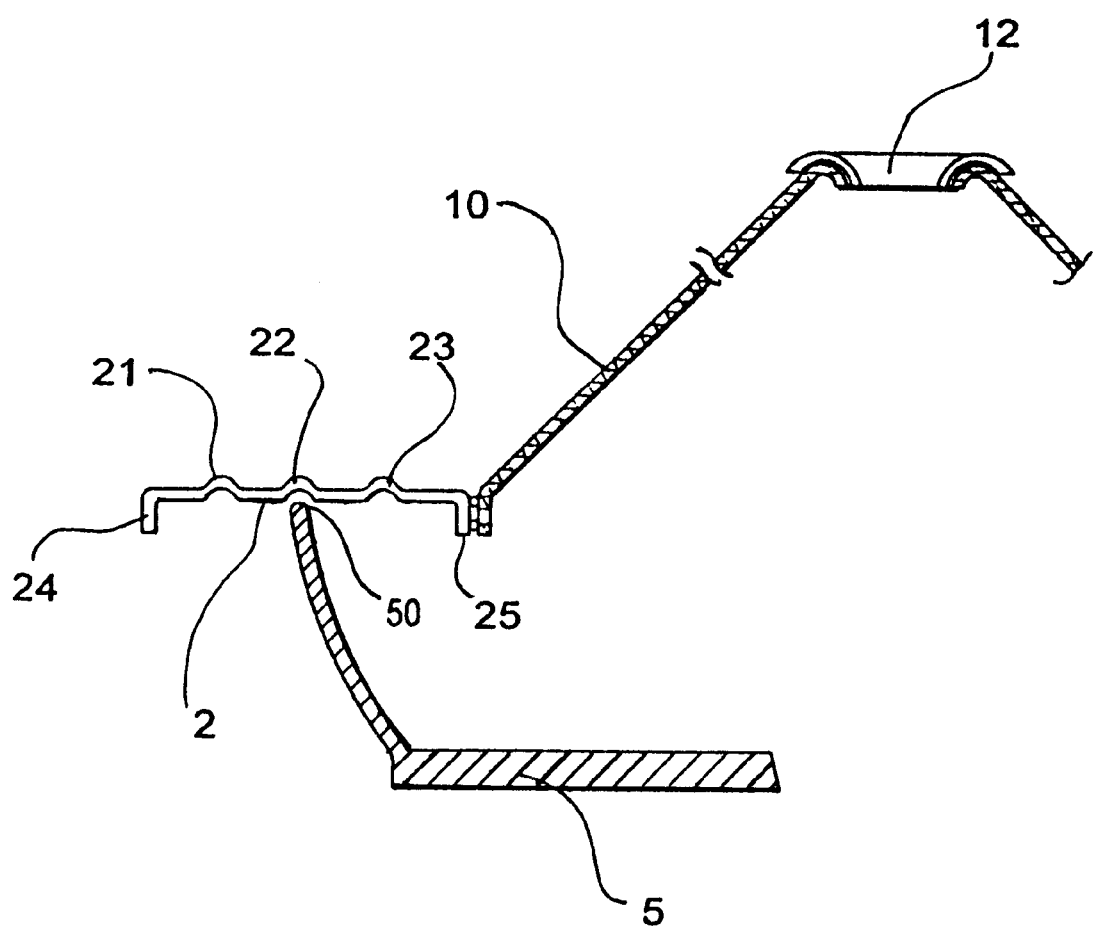
FIG. 4 is a cross-section through a part of the cover hood of FIG. 1 illustrating grooves in a bearing ring of the hood to accommodate the edges of cooking vessels of various diameters.

FIG. 4 shows a partial cross-section through the cover hood according to the invention.

The splash protection grid 10 of the conical hood part 1 is curved at the upper end in the area of the opening 11 and is enclosed with curved cover ring 12. At the lower end, the splash protection grid 10 is angled and is connected with a curved end 25 of the bearing ring 2 through spot welding, riveting, compression or the like.

The bearing ring 2 has several circumferential grooves or indentations 21, 22 and 23 which are formed so that they can receive the circumferential edge 50 of the cooking or frying utensil 5. The bearing ring 2 is provided at its outer end with a downwardly bent end so that a correspondingly large frying or cooking vessel 5 can also be fitted.

Since the splash protection grid 10 of the conical hood part 1 is permeable to steam, large amounts of fluid do not collect at the lower end of the conical hood part 1. Condensed steam running down at the outer edge of the splash grid 10 can be collected in the surface between the inner indentation 23 and the splash grid 10 or with a spaced riveting or welded connection between the grid 10 and bearing ring 2 which runs back into the vessel or utensil 5.

Figure 5:
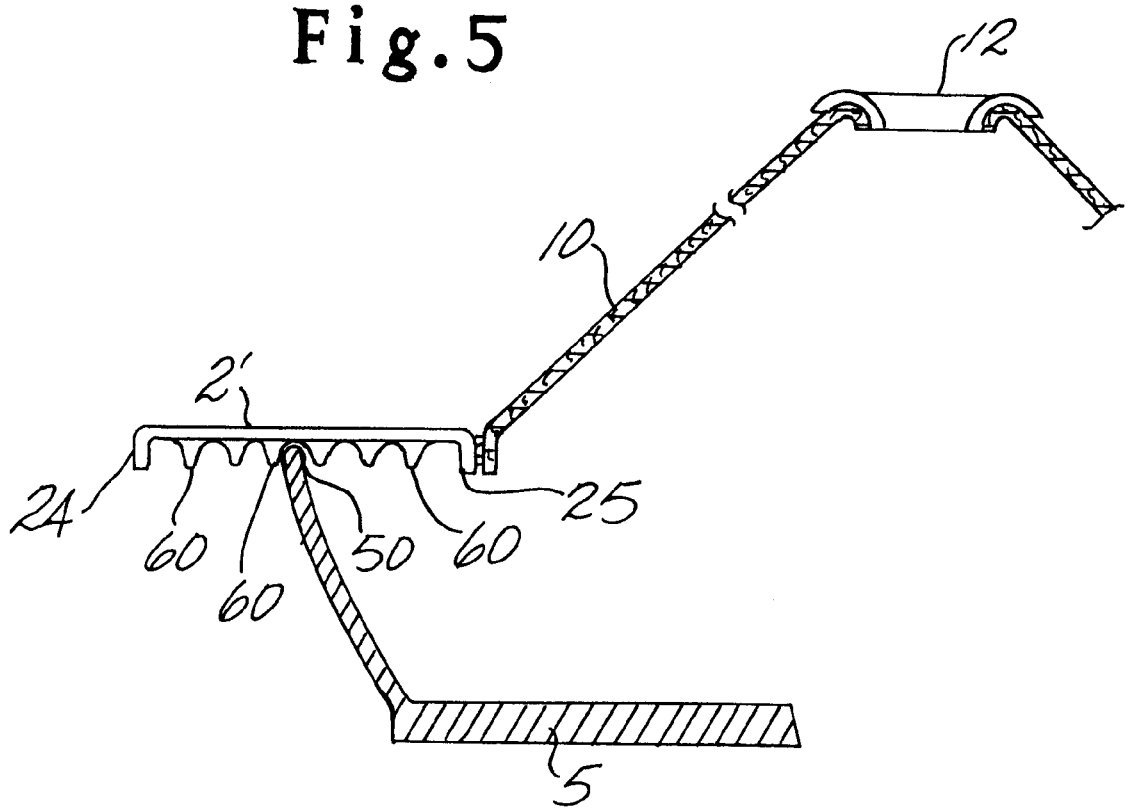
FIG. 5 is a cross-section through a part of a cover hood according to another embodiment illustrating webs attached to the bearing ring of the hood to accommodate the edges of cooking vessels of various diameters.

In an alternative embodiment illustrated in FIG. 5, several vertically projecting webs 60 are provided on the bearing ring 2' to receive the circumferential edge 50 of the cooking or frying utensil 5 instead of the circumferential grooves 21, 22, 23 of the embodiment shown in FIG. 4. The webs 60 are arranged concentrically to each other and on different diameters of the bearing ring in order to accommodate cooking or frying utensils of various diameters. The cross-sectional structure of the webs may be semi-circular or rectangular with rounded inner edges. Preferably, webs 60 are fabricated from the same material as the bearing ring 2'.

Although the present invention has been described with respect to particular embodiments, those skilled in the art will appreciate that the present invention may be modified without departing from the scope of the invention. Accordingly, all such modifications are intended to be included within the scope of the invention as defined by the following claims.

I claim:

1. A cover hood for frying or cooking utensils comprising:
   a hood part which is conical in section and having an upper end, a lower edge, and a spray protection grid having openings extending around the hood part and at varying heights between the upper end and the lower edge;
   a handle attached to the lower edge of the hood part; and
   a bearing part which can be set on the frying or cooking utensil and having a bearing ring which protrudes substantially horizontally from the lower edge of the hood part;
   wherein the bearing ring has at least two circumferential grooves, each of which can be set on the edge of different size cooking utensils;
   wherein the handle is hingedly attached to the hood;
   wherein the hinged handle in a rest position abuts the hood part and in a handling position projects sideways away from the hood part.

2. The cover hood according to claim 1 wherein the bearing ring has an underside comprising a plurality of vertically projecting webs having different diameters and arranged concentrically to each other along the bearing ring.

3. The cover hood according to claim 1 wherein the hinged handle forms an acute angle with the bearing ring in the handling position.

4. The cover hood according to claim 1 wherein the conical hood comprises a truncated cone with an upper circular opening.

5. The cover hood according to claim 4 wherein the circular opening comprises a ring-shaped cap.

6. The cover hood according to claim 5 further comprising a handle attached to the lower edge of the hood and having an attachment; and a connecting web mounted between the attachment of the handle and the ring-shaped cap.

7. The cover hood according to claim 6 wherein the attachment of the handle, the ring-shaped cap, and the connecting web are formed in one piece.

8. The cover hood according to claim 7 wherein the attachment of the handle, the ring shaped cap, and the connecting web are each made of plastic.

9. The cover hood according to claim 6:
wherein the spray protection grid comprises a woven wire mesh.

10. The cover hood according to claim 6 wherein the spray protection grid comprises a perforated plate.

11. The cover hood according to claim 4 wherein the circular opening comprises a flanged edge.

12. The cover hood according to claim 11 further comprising a handle attached to the lower edge of the hood and having an attachment; and a connecting web mounted between the attachment of the handle and the flanged edge.

13. The cover hood according to claim 12 wherein the attachment of the handle, the flanged edge, and the connecting web are formed in one piece.

14. The cover hood according to claim 1 wherein the at least two circumferential grooves are circular.

15. The cover hood according to claim 6
wherein the bearing part is permanently affixed to the hood part.

16. The cover hood according to claim 15 wherein the bearing ring comprises an outer end, wherein the lower edge of the hood part is in the same horizontal plane as the outer end of the bearing ring.

* * * * *